United States Patent
Leinwand et al.

[19]

[11] Patent Number: 6,130,890
[45] Date of Patent: Oct. 10, 2000

[54] METHOD AND SYSTEM FOR OPTIMIZING ROUTING OF DATA PACKETS

[75] Inventors: Allan Steven Leinwand, San Francisco; Bruce Eric Pinsky, San Jose; John Nicol Stewart, Benicia; Bruce Mathieu Hahne, Sunnyvale, all of Calif.

[73] Assignee: Digital Island, Inc., San Francisco, Calif.

[21] Appl. No.: 09/151,935

[22] Filed: Sep. 11, 1998

[51] Int. Cl.[7] .................................................. H04L 12/28
[52] U.S. Cl. ........................................... 370/400; 370/389
[58] Field of Search ..................................... 370/389, 392, 370/400, 401, 402, 412, 410, 351; 340/826

[56] References Cited

U.S. PATENT DOCUMENTS

| | | | |
|---|---|---|---|
| 4,939,726 | 7/1990 | Flammer et al. ........................ | 370/400 |
| 5,629,930 | 5/1997 | Beshai et al. ........................... | 370/412 |
| 5,636,216 | 6/1997 | Fox et al. ............................... | 370/402 |

*Primary Examiner*—Huy D. Vu
*Attorney, Agent, or Firm*—Sawyer Law Group LLP

[57] ABSTRACT

A method and system for determining a route for a packet traveling over at least one system from a source to a destination is disclosed. A first geographic area corresponds to the source and a second geographic area corresponds to the destination. The destination further has an address which does not indicate the second geographic area. In this aspect, the method and system include associating an address for the destination with the second geographic area to allow selection of the route for the data packet based on the second geographic area and selecting the route based on a second geographic area. In a second aspect, the method and system include providing a direct link having a controllable amount of traffic and selecting the direct link as at least a portion of the route when a data packet to the destination is to be routed. The method and system also facilitate selection of a route for a data packet. In this aspect, the method and system include obtaining information relating to an autonomous system. The autonomous system has a geographic area. The information includes the geographic area. In this aspect, the method and system also include associating the autonomous system with the geographic area to allow selection of the route based on the geographic area.

11 Claims, 10 Drawing Sheets

METHOD AND SYSTEM FOR OPTIMIZING ROUTING OF DATA PACKETS

FIELD OF THE INVENTION

The present invention relates to routing of data packets, and more particularly to a method and system for improving routing decisions, particularly for Internet data packets travelling to a destination associated with another country.

BACKGROUND OF THE INVENTION

Information can be transferred between users at different locations using different types of communication networks. The information being transferred typically includes addressing information that indicates the location to which the information is to be relayed. This addressing information allows the network to route the information to the intended recipient.

The communications networks which transfer information include a number of interconnected nodes. A node is a location in the network at which incoming information, such as a stream of data packets, can flow out over one of a plurality of paths. A node contains sufficient intelligence to decide how to choose one of the paths based on the addressing information and the technology used in the network. Thus, the node decides how to route the information. The information may be routed to a next node, traversing the communication network, to arrive at the destination.

One such communication network is a conventional public switched telephone network ("PSTN"). In the conventional PSTN the node is a conventional telephone switch. The routing decision made by the node is for the setup of a telephone call. The addressing information on which the decision is based includes a callee's telephone number. Typically, the callee's telephone number is ten digits. These ten digits include a three digit area code and, in the United States, a three digit exchange. In a conventional PSTN, there is a strong correlation between phone numbers and geographic location. For example, in the ten-digit telephone number, the area code specifies a geographic region. The exchange specifies switches for a portion of the geographic region. The destination, the callee's telephone, is in this portion of the geographic region. In general, when more digits of a phone number are specified, the geographic location of the telephone switch which rings the callee's telephone is better determined. Thus, the nodes in the To conventional PSTN use the callee's telephone number to route the call directly to a geographic region close to the known physical destination of the phone call. Conventional telecommunications switches ensure that a call does not take an excessively long and inefficient path to the callee.

A communication network which utilizes computers is the Internet. Data packets can be transferred between two locations, a source and a destination, via the Internet. The Internet can be viewed as a collection of systems which are compatible with the Internet Protocol ("IP"). The Internet allows for a wider variety of services than other conventional communications networks such as a PSTN. The Internet should also be more fault-tolerant, and allow for a broad range of speeds and transmission media than a PSTN.

Each data packet transferred via the Internet includes addressing information. The addressing information in the data packet includes a destination address for the data packet's destination. The destination address includes an IP address of the destination. An IP address contains four integers, with the integers being separated by periods. Each integer is from zero to two hundred and fifty-five. For example, an IP address and, therefore, a destination address is 202.123.123.6.

IP addresses are typically assigned to autonomous systems ("ASs") within the Internet. An autonomous system is a collection of IP addresses and IP-capable devices and communications links under a single administrative domain. An autonomous system assigned the IP addresses may also be an Internet Service Provider ("ISP"). A particular AS may be assigned a range of IP addresses. For example, a single AS may have the IP addresses 202.123.4.0 through 202.123.7.255. In order to ensure that information is routed to the correct destination, each AS must be able to determine how to reach the autonomous system that is assigned the destination address. Therefore, the ASs of the Internet tell each other how to find every IP address range in the Internet. Each AS announces its range to the entire Internet, declaring that "if you have traffic bound for one of these IP addresses, send it to me." Other ASs use this information to ensure that the data packet reaches the AS assigned the destination address and, therefore, the destination.

There are multiple routes which a data packet can use to traverse the Internet. A route includes the ASs that a data packet travels through in order to reach the destination. Typically, a router acts as a node through which the data packet can access multiple routes to the destination. Using the IP packet's destination address, the routers within the Internet determine how to route the data packet to the AS assigned the destination address and, therefore, the destination. A data packet may pass through a series of routers before reaching the destination. Certain conventional routers select the route such that the fewest number of ASs are crossed before reaching the destination.

Although the Internet is capable of transmitting data packets from a source to a destination, the routing may be slow or may result in data packets being lost. There is no geographic correlation between the destination address and the physical location(s) associated with the AS assigned the destination address. IP addresses may come in clusters because a range of IP addresses may be assigned to the same AS. For example, an AS in Japan might be assigned the IP address range of 202.123.4.0 through 202.123.7.255. However, no convention specifies that all IP addresses of a particular range will be in an AS associated with a specific country or other geographic region. Therefore, similar destination addresses could correspond to destinations which are widely separated geographically. Nothing about a destination address implies the geographic location of the destination or the geographic location of the AS that is assigned the IP address of the destination.

In part because destination addresses are not linked to geographic areas, routers can make non-optimal routing decisions. Non-optimal routing may slow down the end-to-end Internet traffic stream or route the traffic over congested links. As discussed above, routers use the destination address in order to determine routing of a data packet. However, the destination address contains no information relating to the geographic area of the destination, the geographic area of the AS for the destination, or the geographic area of the routers between the source and the destination. As a result, a router may select a route that forces a data packet to travel a very large distance geographically. For example, to reach a destination having an IP address assigned to a first AS in Great Britain, a data packet originating in a second AS in the United States may travel to a third AS in Asia, then to the first AS in Great Britain because this route has the fewest ASs. Because the data packet travels such a large distance, transmission of the packet may be slowed. In addition, the data packet may cross a number of international links, which typically have a very high link utilization. As a result, the data packet may be lost or the transmission of the data packet may be slowed.

Accordingly, what is needed is a system and method for more efficiently routing packets. The present invention addresses such a need.

SUMMARY OF THE INVENTION

The present invention provides a method and system for determining a route for a packet traveling over at least one system from a source to a destination. A first geographic area corresponds to the source and a second geographic area corresponds to the destination. The destination further has an address which does not correspond to the second geographic area. In this aspect, the method and system comprise associating an address for the destination with the second geographic area to allow selection of the route for the data packet based on the second geographic area.

In a second aspect, the method and system comprise providing a direct link having a controllable amount of traffic and selecting the direct link as at least a portion of the route when a data packet to the destination is to be routed.

In another aspect, the method and system function in an Internet environment. In this aspect, the source has a first Internet Protocol ("IP") address assigned to a first autonomous system and the destination has a second IP address assigned to a second autonomous system. The first autonomous system has a first geographic area, and the second autonomous system has a second geographic area. In this aspect, the method and system comprise obtaining the second geographic area for the second autonomous system, mapping the second geographic area to the second autonomous system such that the route can be selected based on the second geographic area, and selecting a direct link to a third autonomous system having the second geographic area for at least a portion of the route. The method and system also facilitate selection of a route for a data packet. In this aspect, the method and system comprise obtaining information relating to an autonomous system. The autonomous system has a geographic area. The information includes the geographic area. The method and system further comprise associating the autonomous system with the geographic area to allow selection of the route based on the geographic area.

According to the system and method disclosed herein, the present invention may route packets such that the packets are delivered to their destination more quickly and with less probability of being dropped during transmission.

DETAILED DESCRIPTION OF THE INVENTION

The present invention relates to an improvement in routing of packets over the Internet, particularly those packets to destinations corresponding to another country. The following description is presented to enable one of ordinary skill in the art to make and use the invention and is provided in the context of a patent application and its requirements. Although the present invention will be described in the context of a particular embodiment, various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
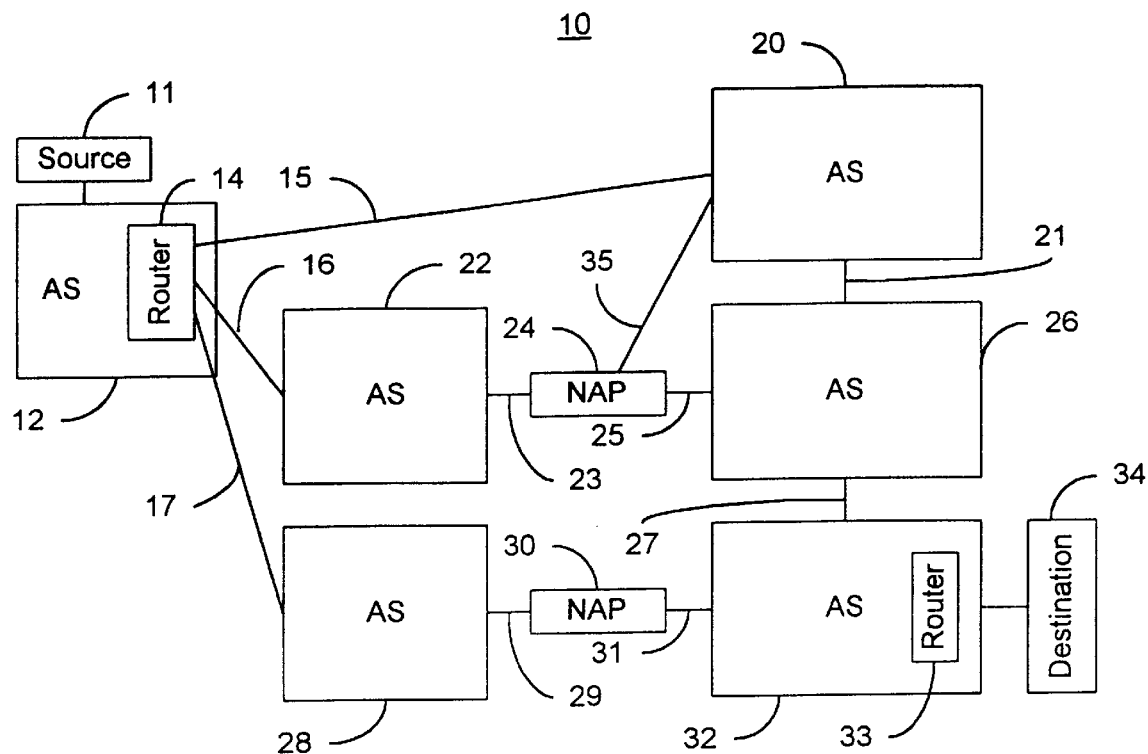
FIG. 1 is a block diagram of a portion of the Internet in which the present invention can be used.

FIG. 1 is a simplified block diagram of a portion of the Internet 10 that can be used for transferring data packets (not shown) between different locations such as the source 11 and the destination 34. The Internet 10 includes a plurality of autonomous systems ("ASs") 12, 20, 22, 26, 28, and 32. The ASs 12, 20, 22, 26, 28, and 32 are interconnected to form the portion of the Internet 10 shown. An AS 12, 20, 22, 26, 28, or 32 may be connected with specific locations. For example, the AS 12 and the AS 32 are connected with the source 11 and the destination 34, respectively. The AS 12 is connected to the AS 20, the AS 22, and the AS 28 through links 15, 16, and 17, respectively. The AS 12 is said to be directly connected to the AS 20 because there is a route between AS 12 and the AS 20 which does not pass through another of the AS 22, 26, 28, and 32. A route is a logical path that a packet may take from a source to a destination. The AS 22 is connected to the AS 26 and the AS 20 via Network Access Point ("NAP") 24, link 23, and links 25 and 35, respectively. The AS 28 is connected to the AS 32 via NAPs 30 and links 29 and 31. NAPs 24 and 30 are more fully described below. The AS 26 is directly connected to the AS 20 and the AS-6 32 via links 21 and 27, respectively.

An AS 12, 20, 22, 26, 28, or 32 often includes one or more enterprise units such as a university, a corporation, or some other organization. However, each AS 12, 20, 22, 26, 28, or 32 may also contain multiple geographically dispersed, unrelated organizations. An AS 12, 20, 22, 26, 28, or 32 may also be assigned one or more ranges of Internet Protocol ("IP") addresses. For example, the AS 12 is assigned the IP address of the source 11. The AS 32 is assigned the IP address of the destination 34. An AS 12, 20, 22, 26, 28, or 32 may also be considered to include at least one router under a single technical administration. For example, the AS 12 and the AS 32 are depicted as having routers 14 and 33, respectively. Although not shown, other routers may exist in the ASs 12, 20, 22, 26, 28 and 32. In addition, a particular AS 12, 20, 22, 26, 28, or 32 appears to other ASs 12, 20, 22, 26, 28, or 32 as having a single coherent interior routing plan. A particular AS 12, 20, 22, 26, 28, or 30 also presents a consistent picture of the locations, such as the destination 34 or the source 11, that are reachable through it.

Each AS 12, 20, 22, 26, 28, and 32 also has a particular AS number associated with it. AS numbers are assigned by three registry organizations, the American Registry for Internet Numbers ("ARIN"), the Reseaux IP Europeans ("RIPE"), and the Asia-Pacific Network Information Center ("APNIC"). Thus, each of the ASs 12, 20, 22, 26, 28, and 32 has an AS number irrespective of where in the world they are located. An AS number is assigned because it is a prerequisite for the use of Border Gateway Protocol version 4 (BGP4). BGP4 is the official and only inter-AS routing protocol currently used in the Internet 10. Therefore, an AS 12, 20, 22, 26, 28, or 32 can be viewed as a collection of Internet routers, such as the routers 14 or 33, which all use the same AS number to connect to the rest of the Internet 10. In the portion of the Internet 10 pictured in FIG. 1, the AS number for each of the ASs 12, 20, 22, 26, 28, or 32 is the number following the dash in FIG. 1. For example, the AS number for the AS 12 is one, while the AS number for the AS 20 is two.

In order to determine how to send a data packet to a destination such as the destination 34, an AS 12, 20, 22, 26, 28, or 32 communicates with the ASs 12, 20, 22, 26, 28, or 32 which may or may not be directly connected. For example, the AS 12 is connected directly to the AS 20 via a high-speed telecommunications link 15. Similarly, the AS 20 is directly connected to the AS 26 via link 16. However, the AS 12 is not directly connected to the AS 26. If the router 14 at the AS 12 is to communicate with the router 33 at the AS 32 or a router (not shown) in the AS 20, there must be some method for the AS 12 to be informed of the how to reach another AS 20, 22, 26, 28, or 32. BGP4 is the protocol that allows the transmission of this reachability information.

Using the reachability information transmitted via BGP4 by each AS 12, 20, 22, 26, 28, and 32 and the addressing information in data packets, the ASs 12, 20, 22, 26, 28 and 32 can communicate and transfer data packets between the source 11 and the destination 34. Each AS 12, 20, 22, 26, 28, and 32 transmits the reachability information describing the range of its assigned IP addresses. The other ASs 20, 22, 26, and 28 receive and relay this reachability information. For examples both the AS 12 and the AS 32 will transmit BGP messages describing the range of IP addresses which are assigned to the AS 12 and the AS 32, respectively. The AS 12 and the AS 32 thus broadcast their reachability information. The AS 26 receives the reachability information for the AS 32 and relays the information to the AS 20. The AS 20 receives the reachability information for the AS 32 from the AS 26. The AS 20 informs the AS 12 that the AS 32 and, therefore, the IP addresses assigned to the AS 32 are reachable via the AS 20. Similarly, the AS 20 receives the reachability information from the AS 12 and relays the information to the AS 26. The AS 26 receives the reachability information for the AS 12 and informs the AS 32 that the AS 12 and, therefore, the IP addresses assigned to the AS 12, are reachable via the AS 26. The AS 12 and the AS 32 announce their IP networks or announce their routes. By acting as a gateway between the AS 12 and the AS 32, the AS 20 and the AS 26 are providing transit service to both the AS 12 and the AS 32. Thus, the AS 20 and the AS 26 allow data packets to transit the AS 20 and the AS 26, respectively. Consequently, data packets can be transferred between the source 11 and the destination 34 using the IP addresses of the source 11 and the destination 34, respectively, as the destination address.

In the context of the exchange of information discussed above, the AS 12 and the AS 20 are said to "peer" with each other because they are directly exchanging reachability information with each other via BGP4. Similarly, the AS 20 and the AS 26 are peering with each other. The AS 26 and the AS 32 are also peering with each other. Although the route described in above example allows the AS 12 and the AS 32 to communicate via the AS 20 and the AS 26, this communication could also take place in a route through the AS 22 and the AS 26, a route through the AS 28, or a route through the AS 22, the AS 20, and the AS 26. Thus, the AS 12 also peers with the AS 22 and the AS 28. Similarly, the AS 36 also peers with the AS 22. The AS 32 also peers with the AS 28. The AS 20 also peers with the AS 22.

Some ASs 22, 26, 28, or 32 establish BGP4 peering by using a NAP, such as NAP 24 and NAP 30. Each NAP 24 and 30 is a common physical location where many ASs can interconnect with each other using high-speed local area network technology. Thus, the NAP 24 allows the AS 22, the AS 20, and the AS 26 to interconnect. Similarly, the NAP 30 allows the AS 28 and the AS 32 to connect. Other ASs (not shown) may also connect to the NAP 24 and the NAP 30.

The Internet 10 has multiple routes between different locations. For example, there are multiple routes between the source 11 and the destination 34. One route is via the AS 20 and the AS 26. Another route is via the AS 22 and the AS 26. On such a route, a data packet would also pass through the NAP 24. A third route is via the AS 28. A data packet would pass through NAP 30 on such a route. A fourth route is via the AS 22, the AS 20, and the AS 26. This route crosses through NAP 24. Having multiple routes is desirable feature because redundant routes allow data packets to follow an alternate route if any single route goes down. However, whenever there are multiple routes to a destination, the router 14 makes a routing decision as to which route to choose for a packet destined to be delivered to the destination 34. The decision as to which route to take is important because the route that a data packet traverses when crossing the Internet 10 determines how quickly that packet will reach its destination and the probability that the packet will be dropped due to congested links along the route.

The routers within an AS 12, 20, 22, 26, 28, or 32 select a route for data packets to use when travelling via the Internet 10. For example, the routers 14 and 33 select the routes for data packets to travel between the source 11 and the destination 34. A data packet from the source 11 includes a destination address indicating the destination 34. The destination address typically includes the IP address of the destination 34. Using the destination address and BGP4, the router 14 selects a route to send the data packet to the AS-6 32 and, therefore, to the destination 34.

When the source 11 transmits a message, such as a data packet, to the destination 34, the router 14 in the AS 12 makes a decision as to which route to take. In particular, the router 14 determines which of the ASs 20, 22, or 28 the data packet will travel to next. As a result, the router 14 decides the link 15, 16, or 17 on which to send the data packet. The router 14 uses reachability information in order to determine the route. The AS 12 receives reachability information via BGP4 about the AS 32 from the AS 20, the is AS 22, and the AS 28. Based on this information, the router 14 in the AS 12 make a decision as to which of the ASs 20, 22, and 28 directly linked to the AS 12 the data packet should travel to. This decision is called choosing the "next hop" because a data packet is typically referred to as "hopping" from one router to another. After the next hop is selected, the data packet travels to the next AS 20, 22, or 28. The data packet then travels through routers (not shown) in the next AS 20, 22, or 28. One such router, at a border of the next AS 20, 22, or 28 determines the subsequent AS which the data packet will hop to next. Thus, these routers (not shown) will select one of the links 21, 24, and 29.

Figure 2:
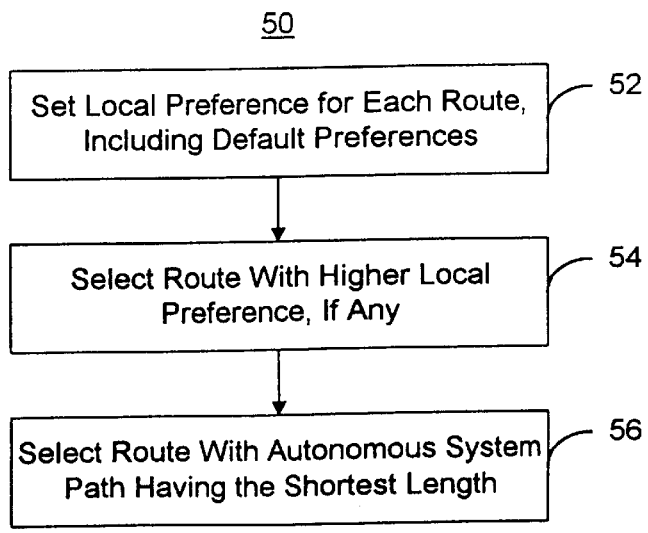
FIG. 2 is a flow chart of a conventional method for selecting a route for transferring a data packet from the source to the destination.

FIG. 2 depicts one conventional method 50 for selecting a route. The conventional method 50 will be described in the context of route selection being performed by the router 14. The conventional method 50 is a next-hop method, which selects a next AS 20, 26, or 28, to which the data packet will hop. Although the complete conventional method for selecting a route includes more steps, only certain steps are shown. First, a local preference for each route is set, via step 52. The local preference is a weight which can be assigned to a particular route. The higher the preference, the more likely that the data packet will travel via the link for that route. If no local preferences are set specifically, then each route is given the same default preference in step 52. If a route has a higher local preference, then via step 54 that route will be chosen. In step 54, therefore, it will be determined that the data packet will traverse the link 15, 16, or 17 for the route having the highest local preference associated. Because the default preferences are typically used for all routes in step 52, step 54 will generally not select a route. If the local preferences are the same, then the route with the fewest number of ASs 12, 20, 22, 26, 28, and 32 is chosen in step 56. The step 56 is known as choosing the route with the AS path having the shortest length. The route is normally selected in step 56 because the default preferences are generally used. In step 56, therefore, it is determined that the data packet will travel via the link 15, 16, or 17 for the route having the shortest AS path.

An AS path is typically defined as an ordered sequence of AS numbers, such as a sequence of AS numbers in the route from a source to a destination. Referring back to FIG. 1, the AS path for the route through the AS 22 and the AS 20 is four, two, three, six. There are four AS numbers in this AS path. Therefore, this AS path has a length of four. The AS path through the AS 22 from the AS 12 to the AS 32 is four, three, six. There are three AS numbers in this AS path, so the length of this AS path is three. Similarly, the AS path through the AS 28 to the AS 32 is five, six, and has an AS path length of two. Finally, the AS path through the AS 20 from the AS 12 to the AS 32 is two, three, six and has a length of three. Using the conventional method 50, therefore, the router 14 will typically choose to send a data packet via the link 17 to the AS 28.

Although the conventional method 50 selects a route allowing a data packet to traverse the internet 10, one of ordinary skill in the art will realize that the route selected may pass through overloaded segments, which delays transmission of the packet or result in the packet being dropped. This results in poor system performance. Although the method 50 reduces the number of ASs 12, 20, 22, 26, 28, and 32, through which a data packet travels, the AS number, the destination address, and the AS path do not indicate the geographic area of the ASs 12, 20, 22, 26, 28, or 32, the source 11, or the destination 34. In addition, the ASs, such as the AS 28 and the AS 32, in the route having the shortest AS path may be widely separated geographically. As a result, a data packet may take a very long time in travelling from the AS 28 to the AS 32, increasing latency time.

In addition, the AS number, the destination address, and the AS path do not indicate the traffic on an AS, link, or NAP. The route selected using the conventional method 50 may, therefore, include overloaded ASs 12, 20, 22, 26, 28 or 32 or overloaded NAPs 24 or 30. For example, assume that the AS 28 is overloaded. Similarly, assume that the NAP 30 is overloaded. The method 50 will result in the data packet travelling via link 17 even if another route would be more efficient. As a result, the data packet will travel through the AS 28 and the NAP 30, which are both overloaded. Consequently, the data packet may be dropped or delayed.

These problems may be exacerbated when the AS 20 and the AS 32 assigned the address of the destination 34 are not in the same country as the source 11. Because the data packet is travelling internationally, larger geographic distances may be involved. Thus, latencies introduced due to the data packet traveling large distances are increased. For example, presume that the AS 20, the AS 26, and the AS 32 are in Great Britain, while at least the AS 12 is in the United States. Also suppose that the AS 28 is in Asia. Using the conventional method 50, the data packet will travel from the United States to Asia, then to Great Britain. Because the data packet travels between three continents, the data packet may take longer to reach the destination 34 than if the data packet traveled via a route having a longer AS path.

Similarly, the fact that international links are involved may further affect transmission of the data packet. For example, presume that the AS 20, the AS 26, and the AS 32 are in Great Britain, while the AS 12, the AS 22, and the AS 28 are in the United States. Thus, the links 15, 25, and 31 are international links between Great Britain and the United States. International links are often highly overloaded. However, assume that the link 15 can provide a much quicker route to the destination 34. The conventional method 50 may still determine that the data packet is to be sent to the AS 28 via the link 17 because this is the shortest AS path. As a result, transmission of the data packet may be delayed or the data packet may be dropped. The delay or probability that the data packet is dropped may be higher because the link 17 is an international link very likely to be overloaded. As a result, the user at the source 11 or destination 34 may not receive an important data packet or may not receive the data packet in the requisite time.

The present invention provides a method and system for determining a route for a packet traveling over at least one system from a source to a destination. A first geographic area corresponds to the source and a second geographic area corresponds to the destination. The destination has an address which does not indicate the second geographic area corresponding to the destination. In this aspect, the method and system comprise associating an address for the destination with the second geographic area to allow selection of the route for the data packet based on the second geographic area and selecting the route based on a second geographic area.

In a second aspect, the method and system comprise providing a direct link having a controllable amount of traffic and selecting the direct link as at least a portion of the route when a data packet to the destination is to be routed.

In another aspect, the method and system function in an Internet environment. In this aspect, the source has a first Internet Protocol ("IP") address assigned to a first autonomous system and the destination has a second IP address assigned to a second autonomous system. The first autonomous system has a first geographic area, and the second autonomous system has a second geographic area. In this aspect, the method and system comprise obtaining the second geographic area for the second autonomous system, mapping the second geographic area to the second autonomous system such that the route can be selected based on the second geographic area, and selecting a direct link to a third autonomous system having the second geographic area for at least a portion of the route.

The method and system also facilitate selection of a route for a data packet. In this aspect, the method and system comprise obtaining information relating to an autonomous system. The autonomous system has a geographic area. The information includes the geographic area. In this aspect, the method and system also comprise associating the autonomous system with the geographic area to allow selection of the route based on the geographic area.

Because the geographic area of the destination is taken into account, an efficient route between the source and the destination may be selected. Because a direct link having a controllable amount of traffic is used in one aspect, a more efficient route may be selected. Thus, delays in transmission may be reduced. In addition, the probability that a data packet may be dropped during transmission may also be reduced. Consequently, system performance may be improved.

The present invention will be described in terms of routing data packets to particular countries, particular sources of information, certain protocols, and particular routers using certain algorithms to determine routing of a packet. However, one of ordinary skill in the art will readily recognize that this method and system will operate effectively for other types of packets, other destinations, other sources of information, other protocols, and other routers using other algorithms to determine routing. Moreover, nothing prevents the method and system from being used in a single country. The present invention will also be described in the context of a performing route selection for an AS from which a data packet originates. However, one of ordinary skill in the art will realize that the present invention may be used in another AS from which the data packet does not originate. The present invention is also described in the context of selecting a route for sending a data packet from a particular source to a particular destination. However, nothing prevents the method and system from being used in conjunction with a different source or destination.

Figure 3:
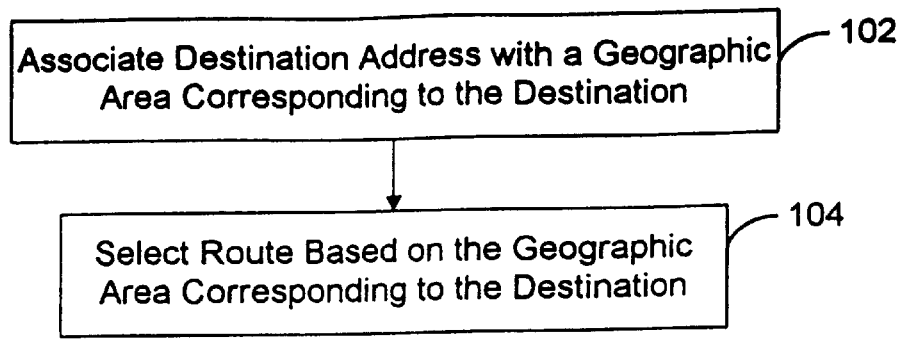
FIG. 3 is a flow chart depicting one embodiment of a method for selecting routes based on geographic area in accordance with the present invention.

To more particularly illustrate the method and system in accordance with the present invention, refer to FIG. 3 depicting one embodiment of a method 100 in accordance with the present invention for selecting a route based on geographic area. The method 100 is discussed in the context of a data packet travelling from the source 11 to the destination 34. The destination 34 has an address. In a preferred embodiment, the address is the IP address of the destination 34. A geographic area corresponds to the destination 34. In some embodiments, the geographic area corresponding to the destination 34 is the geographic area for the AS 32 assigned the IP address of the destination 34. In a preferred embodiment, the geographic area corresponding to the destination 34 is the country or countries for the AS 32 which is assigned the IP address of the destination 34. However, in an alternate embodiment, the geographic area could be another area, such as a particular area in which the AS 32 is located or the geographic area in which the destination 34 is located. Note that the location of the destination 34 could be different from the geographic area of the AS 32 which is assigned the IP address of the destination 34.

The address is associated with a geographic area corresponding to the destination 34, via step 102. The route for the data packet is then selected based on the geographic area corresponding to the destination 34, via step 104. In some embodiments, the data packet includes the destination address, which is preferably the IP address of the destination 34. In this embodiment, step 104 is performed using the destination address of the data packet and the association between the address and the geographic area created in step 102. Also in a preferred embodiment, step 104 includes selecting a privately owned direct link to an AS in the same country as the AS 32 which is assigned the IP address of the destination 34. In such an embodiment, the country of the AS 32 is preferably represented by an International Standards Organization country code ("country code"). In another embodiment, step 104 includes selecting a privately owned direct link to an AS in a country near the country in which the AS 32 is located.

Figure 4:
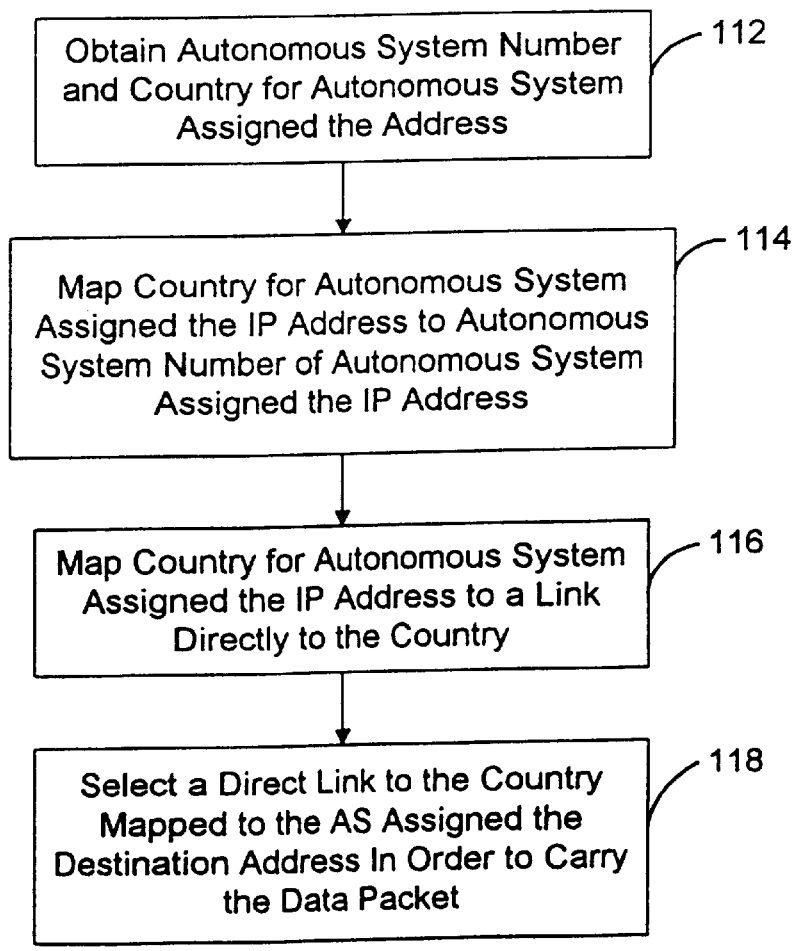
FIG. 4 is a more detailed flow chart of one embodiment of a method in accordance with the present invention for selecting a route for a data packet.

FIG. 4 depicts a more detailed flow chart of a preferred embodiment of a method 110 for selecting routes in accordance with the present invention. In discussing the method 110, it is presumed that the method 110 is performed for a router 14 in the AS 12. The country and AS number are obtained for the AS 32 which is assigned the IP address of the destination 34, via step 112. Thus, in this embodiment, the geographic area corresponding to the destination is the country or countries for the AS 12 assigned the IP address of the destination. Also in a preferred embodiment, an AS number represents an AS. Each country is preferably represented by its country code. The country for the AS 32 is then mapped to the AS number of the AS 32, via step 114. Consequently, the IP addresses assigned to the AS 32 are also associated with the country for the AS 32. The country associated with the AS number is then mapped to a particular link directly to the country, via step 116. Thus, the country associated with the AS 32 is mapped to the direct link 15 in step 116. In a preferred embodiment, the direct link is a privately owned link between a particular AS, such as the AS 12, and an AS in the second country. Also in a preferred embodiment, the traffic over the direct link is controllable, for example by ensuring that the direct link is not overloaded. The link to the country is then selected to carry the data packet, via step 118.

To more particularly describe the advantages of the methods 100 and 110, refer back to FIG. 1. Assume that the AS 12, the AS 22, and the AS 28 are in a first country, such as the United States. Also assume that the AS 20, the AS 26, and the AS 32 are located in a second country such as Great Britain. The link 15 is a privately maintained international link directly between the AS 12 and the AS 20 in the second country. The links 25 and 31 between the first country and the second country may be conventional international links and, therefore, subject to overloading. The methods 100 or 110 are performed for the router 14 in the AS 12.

The AS 32 assigned the IP address of the destination 34 is associated with the second country. The AS number of the AS 32 and the identity of the second country, Great Britain, are obtained in step 112. The second country is mapped to the AS number of the AS 32 in step 114. Thus, step 114 can be considered to associate the geographic area of the AS 32 with the IP address of the destination 34 because the second country is mapped to the AS number of the AS 32 assigned the IP address of the destination 34. The link 15 between the second country and the router 14 in the AS 12 is mapped to the country, in step 116. Thus, in step 118, the route is selected so that the data packet travels via link 15 to the AS 20 in the next hop.

Because the next hop is through link 15, the speed and probability of the data packet not being dropped are improved. The link 15 is directly between the AS 12 and the country of the AS 32. Thus, a data packet from the source 11 will travel from the AS 12 to the AS 20 in the second country. The data packet will then travel intra-country from the AS 20 to the AS 26 and the AS 32. Consequently, the distance traveled by the data packet being sent to the destination 34 is reduced. Thus, transit time is improved and the probability that the data packet will be dropped due to congestion is reduced.

Figure 5A:
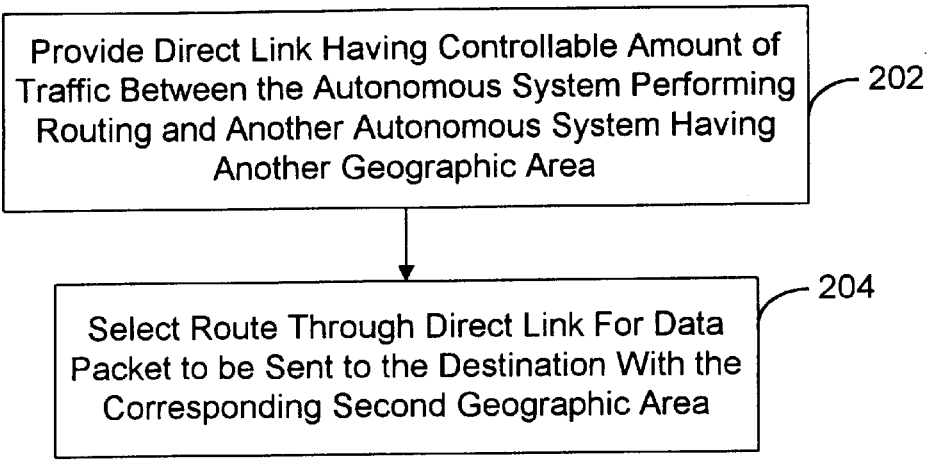
FIG. 5A is a flow chart depicting one embodiment of a method for selecting routes in accordance with the present invention.

The method and system in accordance with the present invention can also be viewed as selecting routes based on links coupled to the router that is determining the route for a data packet. FIG. 5A depicts one embodiment of such a method 200 for selecting a route in accordance with the present invention. FIG. 5A will be discussed in conjunction with sending a data packet from the source 11 to the destination 34 in FIG. 1. The source 11 corresponds to a first geographic area and is associated with a first AS 12. The destination 34 corresponds to a second geographic area and is associated with a second AS 32. Although the method 200 is also described as being performed for the router 14 in the first AS 12, nothing prevents the method 200 from being performed for another router in another AS. For example, the method 200 may be performed for a third router (not shown) in a third AS (not shown) having a third geographic area.

A direct link having a controllable amount of traffic, such as the link 15, is Mao provided, via step 202. The direct link is between the AS 12 routing the data packet and a particular AS 20. The AS 20 has an associated geographic area and is preferably in geographic proximity to the second AS 32. It is then ensured that the direct link will be used when routing a data packet to the destination 34, via step 204. Thus, the data packet will travel via the direct link 15 to the AS 20, then via AS 26 to the second AS 32.

In a preferred embodiment, the direct link 15 is privately controlled. Thus, overloading of the direct link 15 may be prevented or reduced. Also in a preferred embodiment, the first geographic area and second geographic areas include the geographic area(s) for the first AS 12 and the second AS 32, respectively. However, in an alternate embodiment, the geographic areas could be other areas. For example, the first or second geographic area could include the particular areas in which the first or second ASs is located or could include the geographic area in which the source 11 or destination 34 is located. Also in a preferred embodiment, the second geographic area is the same as the geographic area for the AS 20. Consequently, the direct link is preferably to the AS 20 having the same geographic area as the second AS 32. This aids in reducing the geographic distance that the data packet travels. The transit time and probability that a packet will be dropped are thereby reduced.

Figure 5B:
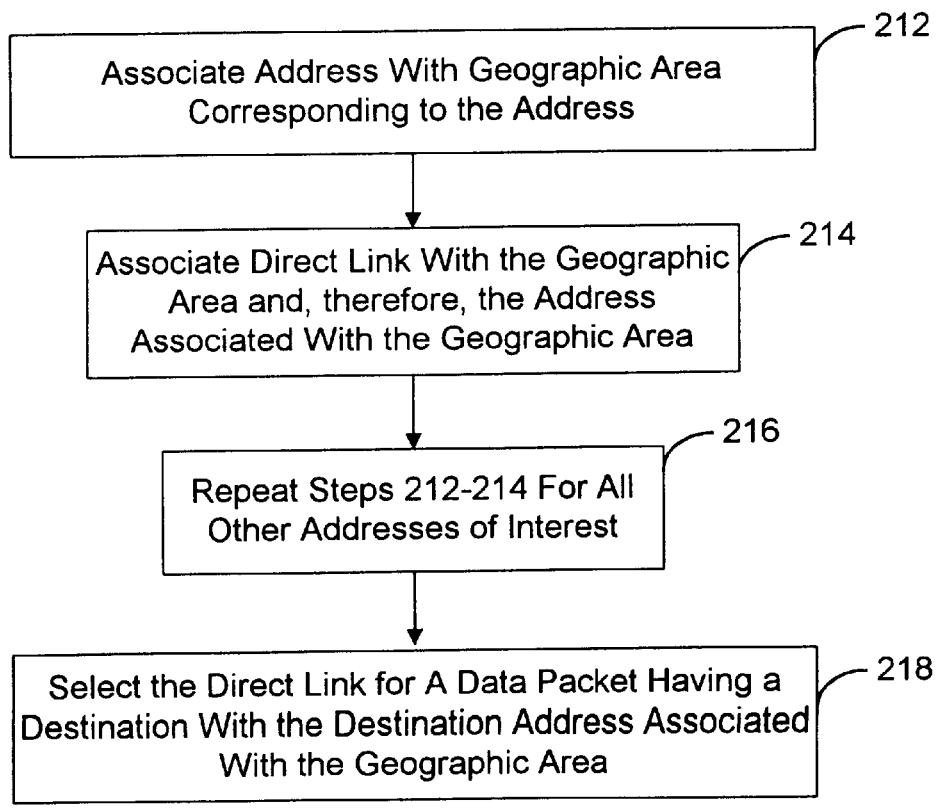
FIG. 5B is a more detailed flow chart of one embodiment of a method for selecting routes in accordance with the present invention.

FIG. 5B depicts a more detailed flow chart of a method 210 for selecting a route in accordance with the present invention. For clarity, FIG. 5B will be discussed in conjunction with FIG. 1. Thus, the method 210 is presumed to be carried out for the router 14 in the AS 12 coupled with the source 11. However, nothing prevents the method 210 from being carried out for another router. The method 210 utilizes a geographic area corresponding to the destination 34 as well as a direct link 15 having a controllable amount of traffic.

An address is associated with at least one geographic area via step 212. Preferably, this is accomplished by associating the address with the geographic area(s) of the AS to which the address has been assigned. Also in a preferred embodiment, the ASs are represented by their AS numbers and the geographic areas by country codes. The geographic area is then associated with a direct link 15 having a controllable amount of traffic, via step 214. In a preferred embodiment, this is accomplished by associating the direct link 15 with the country code(s) of the AS 20 and the AS 12 to which the direct link is coupled. Steps 212 and 214 are then repeated for all addresses of interest, via step 216. The direct link 15 is then selected for a data packet whose destination address is one of the addresses in steps 212 through 216, via step 218.

When a route is chosen through a direct link via the method 200 or 210, the data packet may be more efficiently routed through the Internet 10. Preferably the link 15 is privately maintained, preventing overloading of the direct link 15. When the router 14 routes a data packet using the method 200 or 210, the router 14 will choose to send the data packet via the direct link 15. In the method 210, this is because the AS 20 is associated with the same geographic area as the AS 32. Thus, the data packet is sent over a private link having a controlled amount of traffic to an AS 20 that may be geographically close to the AS 32. As a result, transmission time and probability of dropping the data packet are improved.

Where the direct link 15 is an international link, this improvement in performance may be even more substantial. The destination 34 may correspond to a country different from the country corresponding to the source 11. Preferably, the country corresponding to the destination 34 is the same as a country or the countries associated with the AS 20. The links 25 and 31 may also be international links and highly oversold.

Transmission through one of these links 25 or 31, which would be in the route selected by the conventional method 50, may be highly inefficient. Because the AS 22, the AS 28, the NAP 24 and the NAP 30 may be in different countries from the AS 32, they may also be even more widely separated from the AS 32. In contrast, transmission via the link 15 would be relatively efficient because the link 15 may not be oversold and because the AS 20 connected to the link 15 may not be widely spaced from the AS 32. Consequently, transit time and probability that a packet would be dropped may be substantially lowered.

Figure 6:
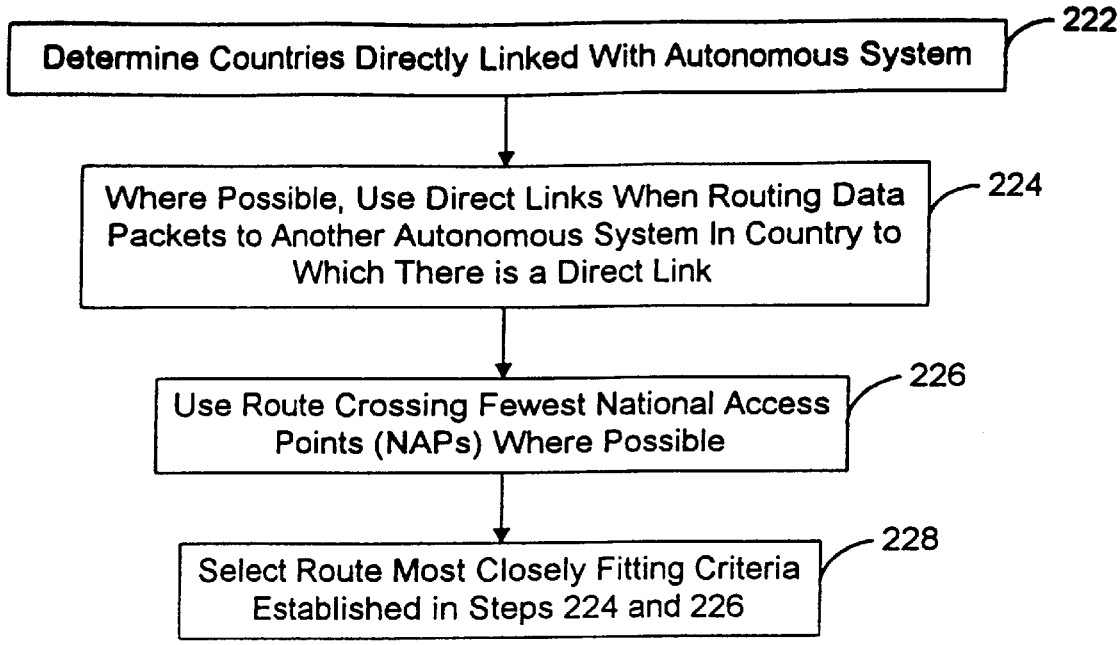
FIG. 6 is a flow chart depicting a preferred embodiment of a method in accordance with the present invention for selecting a route based on geographic area.

FIG. 6 depicts a flow chart of a preferred embodiment of a method 220 of selecting a route in accordance with the present invention. In discussing FIG. 6, it will be assumed that the method 220 is being performed for the AS 12. Via step 222, it is determined which countries are directly connected with the AS 12 via links having a controllable amount of traffic. Preferably, the countries are directly connected with the AS 12 through privately maintained links, such as the link 15. It is decided that these direct links 15 will be used when routing data packets to an AS 20, 22, 26, 28, or 32 in that country or in a nearby country, via step 224. Thus, the criteria determined in step 224 ensure that data packets will traverse the Internet 10 from the AS 12 through direct links 15, where possible. It is then decided that the route also crossing fewer NAPs 24 or 30 will be used, via step 226. A route most closely fitting these criteria is then selected via step 228.

It is desirable to select a direct link which is privately maintained in step 224 because the traffic on such links 15 can be controlled and because the direct link 15 is to an AS 20 that may be relatively close to the AS 32. Thus, even though the link 15 is an international link, the link 15 should not be overloaded. In addition, the data packet may not need to travel to ASs widely separated from the AS 32 assigned the IP address of the destination 34. It is desirable to cross few NAPs 24 or 30 because NAPs 24 and 30 typically have a great deal of traffic. Therefore, a route having relatively low traffic will be selected in step 228. Consequently, transmission time and probability that the data packet will be dropped is reduced.

Figure 7:
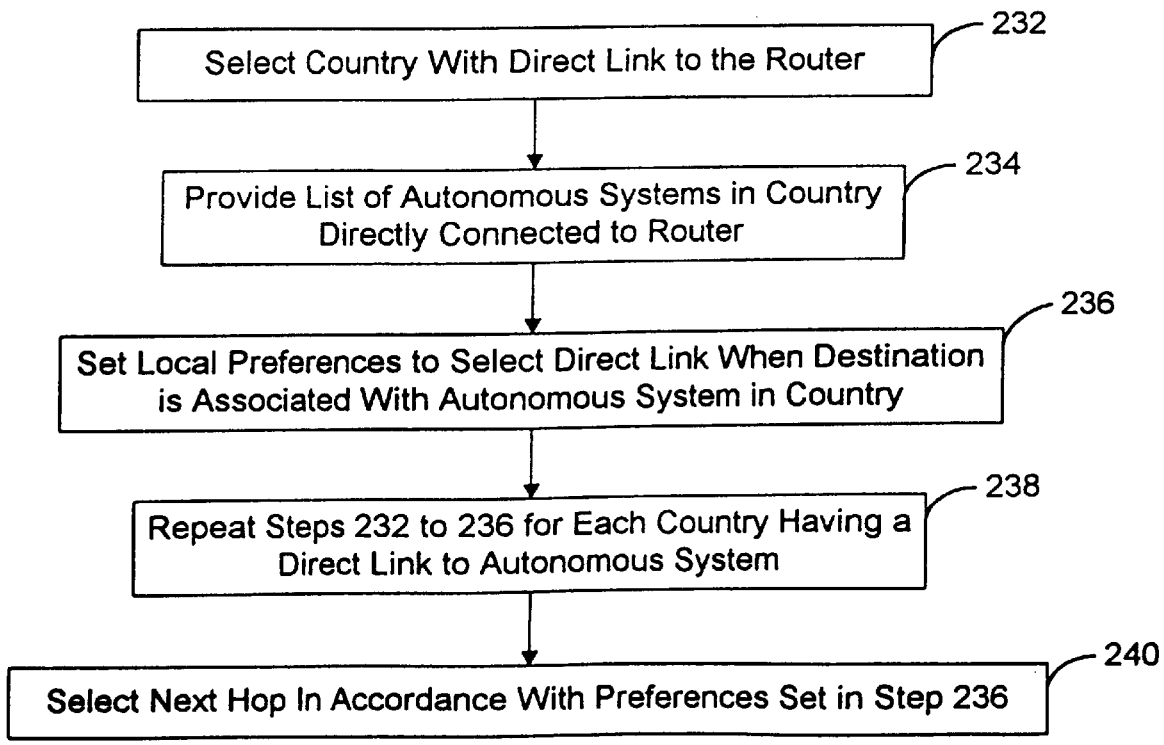
FIG. 7 depicts a more detailed flow chart of the preferred embodiment of a method in accordance with the present invention for selecting a route based on geographic area.

FIG. 7 depicts a more detailed flow chart of a preferred embodiment of a method 230 in accordance with the present invention. In discussing the method 230, it is presumed that the method 230 is performed for a router 14 in the AS 12. In a preferred embodiment, the router 14 utilizes a next-hop method, discussed with respect to FIG. 2. Referring back to FIG. 7, a country to which the router 14 connects directly is selected, via step 232. Thus, the country to which the link 15 connects the router 14 is selected in step 232. Preferably, the link is privately owned or maintained and has a controllable amount of traffic. In other words, the overloading of the link can be prevented. A list of the AS numbers for the ASs 20, 26, and 32 within that country is then produced, via step 234. Via step 236, the local preferences are set so that the link 15 is preferred when the router 14 receives a data packet having a destination address for the destination 34 having its IP address assigned to an AS in the country, such as the AS 32. In a preferred embodiment, step 236 is performed by setting the local preference to an arbitrary value greater than the default value when the destination 34 is associated with an AS, such as the AS 32, in the country. Steps 232 to 236 are then repeated for each country (not shown) to which the AS 12 is directly connected, via step 238. Via step 240 the next hop for the data packet is selected in accordance with the preferences set in step 236.

Thus, referring back to FIG. 1, the router 14 will select the route through the link 15 when the methods 200, 210, 220, or 230 in accordance with the present invention are used. The route through the link 15 is the only route directly to the AS 20 in the same country as the AS 32 assigned the IP address of the destination 34. Moreover, the route through the link 15 does not cross the NAP 24 or the NAP 30. Thus, the local preference for the route through the link 15 will be set high and the data packet will travel via link 15 on the next hop. The link 15 will be selected even though the AS path length is three for the route through the link 15, while the AS path length through the link 17 is two. As a result, the data packet will traverse a route that is less overloaded. The data packet may, therefore, have a reduced transmission time and a lower probability of being dropped during transit.

Figure 8:
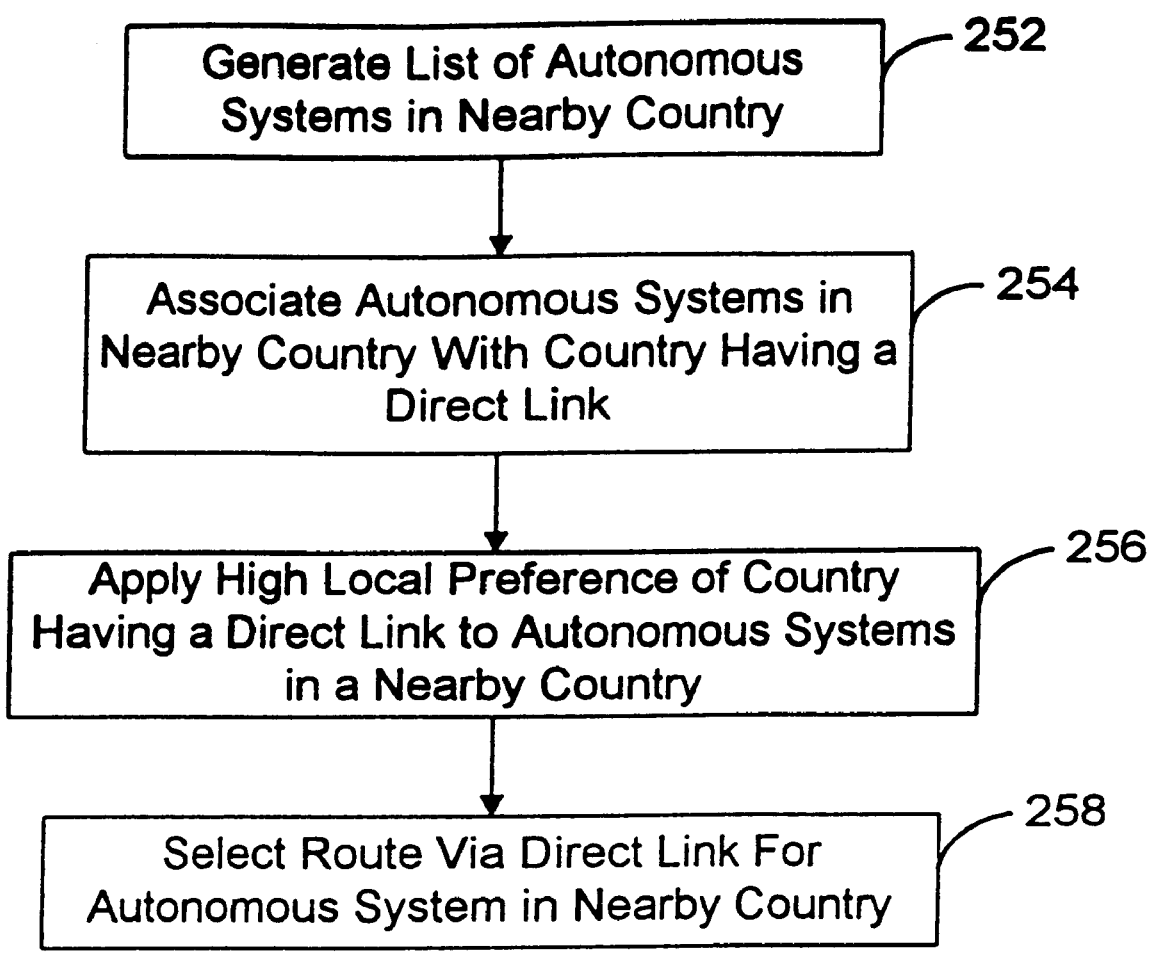
FIG. 8 depicts one embodiment of a method in accordance with the present invention for selecting a route based on geographic area when the autonomous system is not directly connected to the country of the autonomous system associated with the destination.

FIG. 8 depicts a method 250 in accordance with the present invention which has been extended to nearby countries. Such nearby countries are logically connected to a directly connected country in a non-overloaded fashion. In discussing the method 250, it is presumed that the method 250 is performed for a router 14 in the AS 12. Thus, a nearby country is near to a country having a direct link 15 to the AS 12. The nearby country is treated as part of the country directly connected to the AS 12. Thus, a list of ASs (not shown) in the nearby country is generated, via step 252. The AS numbers for these ASs are then associated with the country to which the AS 12 is directly connected, via step 254. The local preferences of the country to which the AS 12 is directly connected are then applied to each AS in the nearby country, via step 256. Because of how these preferences are set, the route through the direct link is then selected, via step 258. As a result, the data packet may be sent through a relatively low traffic route even where the AS 12 is not directly connected to the country for the AS (not shown) assigned the IP address of the destination (not shown).

Figure 9:
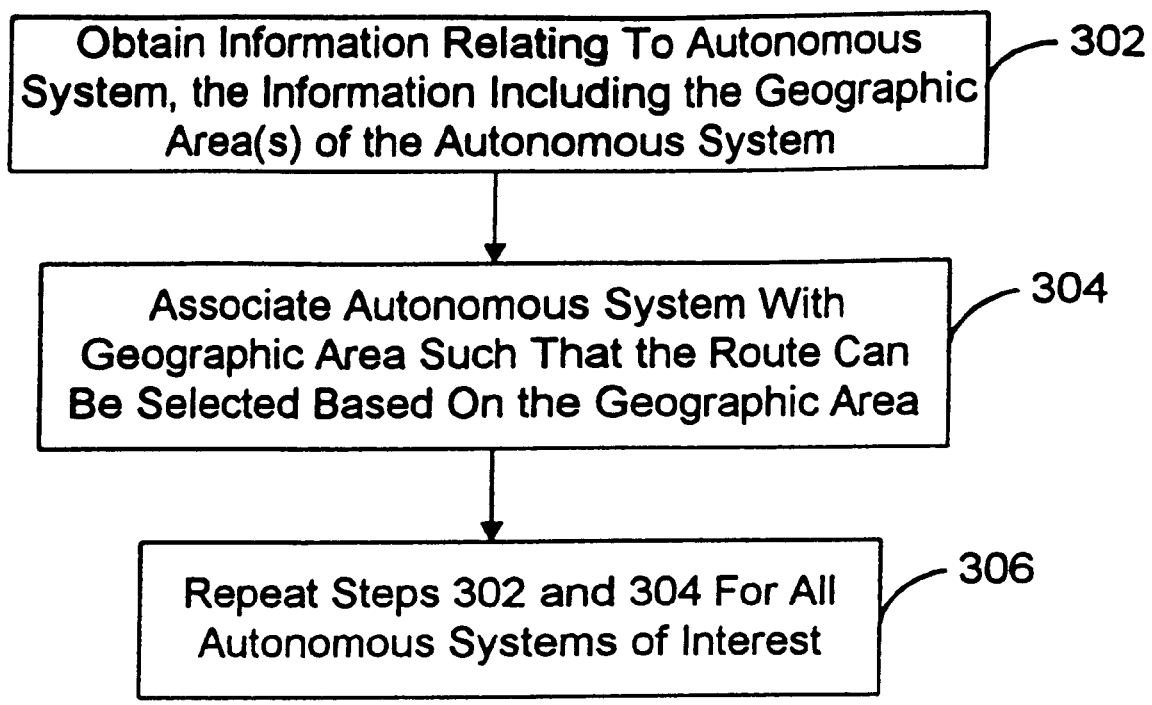
FIG. 9 is flow chart of one embodiment of a method in accordance with the present invention for associating a geographic area with an address.

FIG. 9 depicts an embodiment of one method 300 for associating the destination address with a geographic area corresponding to the destination. Information relating to an AS of interest is obtained via step 302. The AS of interest is assigned IP addresses, such as the destination address. The information includes the geographic area(s) for the AS of interest. In one embodiment this information also includes the country code(s) or country/countries of the AS. Also in one embodiment, the information is obtained using the AS number of the AS of interest. The geographic area(s) of the AS are then associated with the address so that a route can be selected based on the geographic area, via step 304. In a preferred embodiment, this includes associating the AS number with the country code. Also in a preferred embodiment, step 304 includes creating or adding to a database which can be used when a router, such as the router 14, selects a route. Steps 302 and 304 are then repeated for all ASs of interest, via step 306.

FIGS. 10A through 10D depict embodiments of the method 300 for associating one or more geographic areas with an AS when the information relating to the ASs is located in an accessible database. FIGS. 10A through 10D will be discussed in the context of routes being selected by a router 14 in the AS 12. As discussed previously, AS numbers assigned by ARIN, RIPE, and APNIC. Each of these organizations maintains a publicly-accessible database of its AS number assignments, including postal address and other contact information for the assignee of each AS number. Each of the three public databases is in a distinct format designed to be human-readable, not machine-parsable. The method 300 obtains the appropriate information from the databases and converts the information into a format that can be used when routing data packets. Thus, the method 300 preferably commences after it has been determined which database contains information relating to the AS 12, 20, 22, 26, 28, or 32 that is of interest.

Figure 10A:
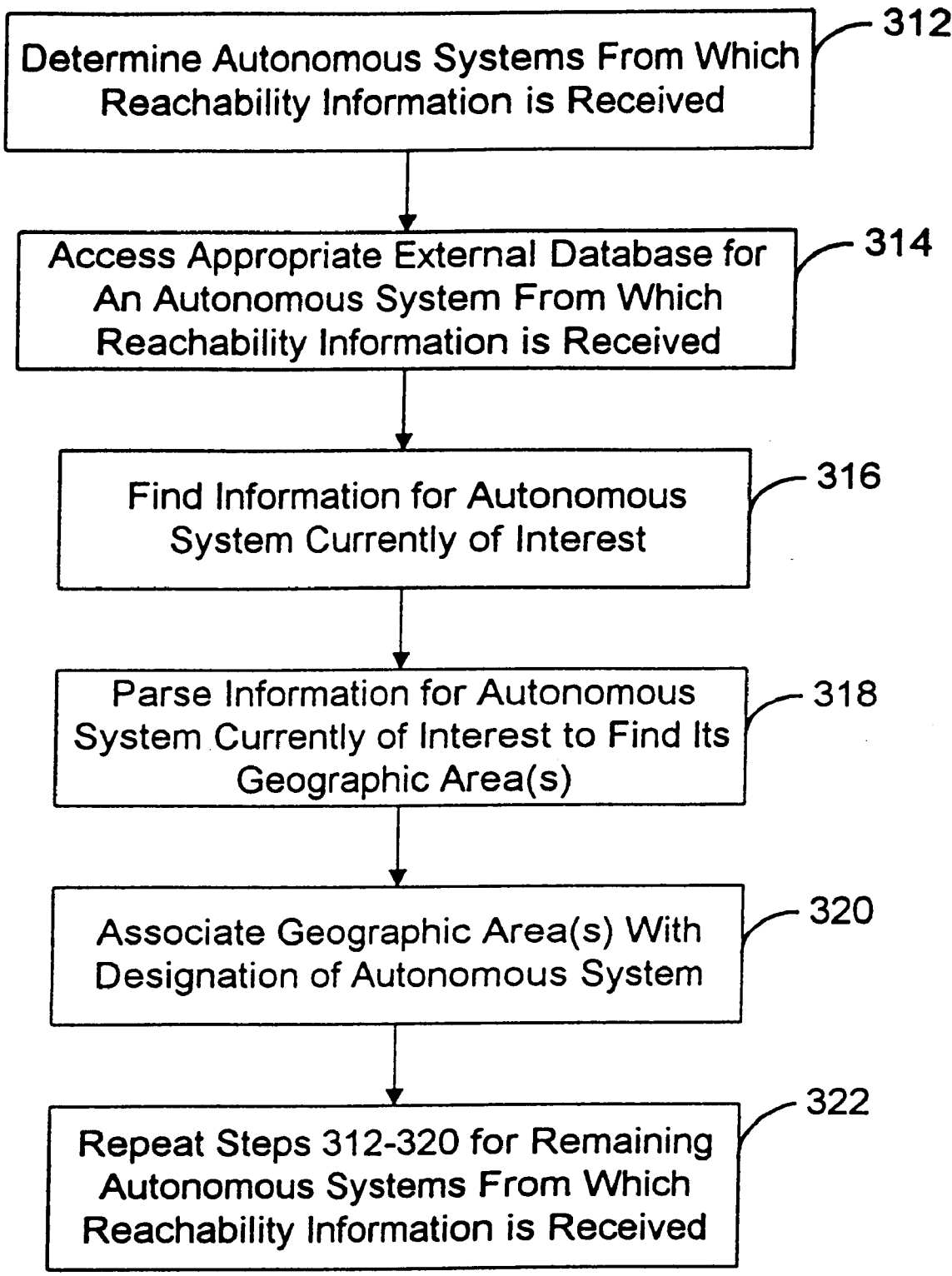
FIG. 10A is flow chart of one embodiment of a general method in accordance with the present invention for associating a geographic area with an address using an external database.

FIG. 10A depicts an embodiment of a general method 310 for associating an address with a corresponding geographic area for a general external database. The ASs 20, 22, 26, 28, and 32 for which the AS 12 receives reachability information are determined, via step 312. The appropriate external database for one of the ASs 20, 22, 26, 28, or 32 is accessed, via step 314. The database includes information relating to certain of the ASs 20, 22, 26, 28, or 32. The information includes the designation of the ASs 20, 22, 26, 28, or 32 and the geographic area of the ASs 20, 22, 26, 28, and 32 having information in the database.

In one embodiment, designation of the AS 20, 22, 26, 28, and 32 is its AS number. In one embodiment, geographic area of the AS 12, 20, 22, 26, 28, and 32 is indicated by its country code. Note that a particular one of the ASs 20, 22, 26, 28, or 32 may have more than one country code assigned to it. The information relating to a particular AS, such as the AS 20, 22, 26, 28, or 32, is found via step 316. In one embodiment this information is found by using the AS number for the particular AS 20, 22, 26, 28, or 32 that is of interest. The information for the particular AS 20, 22, 26, 28, or 32 is then parsed to find the geographic area, via step 318. In one embodiment, the country code for the AS 20, 22, 26, 28, or 32 is found in step 318.

If more than one country code is assigned to an AS 20, 22, 26, 28 or 32, then more than one country code is found in step 318. The geographic area is then associated with the designation of the AS 12, 20, 22, 26, 28, or 32, via step 320. In a preferred embodiment, step 320 includes creating a database associating the country code of an AS 20, 22, 26, 28, or 32 with its AS number. If an AS 20, 22, 26, 28, or 32 has more than one country code, then the step 320 includes creating a database associating all the country codes of the AS 20, 22, 26, 28, or 32 with its AS number.

In one embodiment, the database created in step 320 is machine-readable and can be used by the router 14 to select a route. In one embodiment, this database maps the country code(s) and AS number of an AS 12, 20, 22, 26, 28 or 32 for the AS which will select the route and an AS in the same country as or a nearby country to the AS 20, 22, 26, 28, or 32 of interest.

For example, when the method 310 is performed for the AS 12, the database will map the AS number to the country code(s) of the country or countries in which AS 12 is located. Via step 322, steps 312 through 320 are then repeated for each of the remaining ASs 20, 22, 26, 28, or 32. Thus, in one embodiment, the method 310 provides a separate, privately maintained database, which can pinpoint the country or countries in which each AS 12, 20, 22, 26, 28, and 32 is located with a high level of accuracy.

Figure 10B:
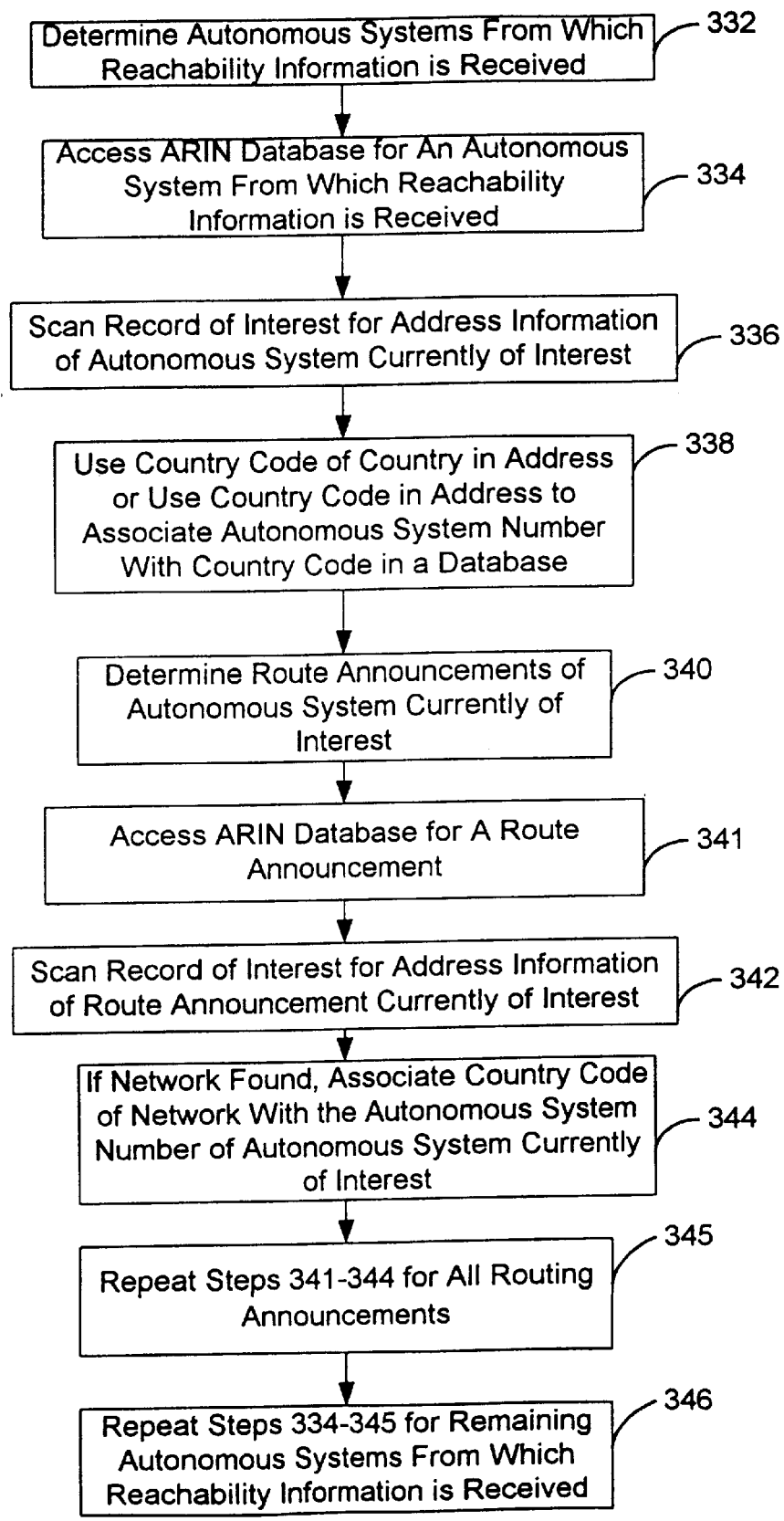
FIG. 10B is flow chart of a preferred embodiment of the method in accordance with the present invention for associating a geographic area with an address using a first external database.

FIG. 10B depicts a more detailed flow chart of a preferred embodiment of a method 330 used to associate an AS with a geographic area using an ARIN maintained database. The ASs 20, 22, 26, 28, and 32 for which the AS 12 receives reachability information are determined, via step 332. The database maintained by ARIN is then queried for information regarding one of the ASs 20, 22, 26, 28, and 32, via step 334. In one embodiment, step 334 includes querying the name server whois.arin.net to obtain the registration record for the AS number of the AS 20, 22, 26, 28, or 32 that is currently of interest. Via step 336 the first few lines of the registration record are scanned to look for address information for the AS 20, 22, 26, 28, or 32. If the postal address contains a country name, that country's code is used to associate the AS number with the country code in step 338. If the postal address contains a country code, that country code is used to associate the AS number with the country code in step 338. In one embodiment, step 338 includes creating or adding to a database associating the AS number with the country code. The route announcements for the AS 20, 22, 26, 28, or 32 of interest are also determined, via step 340. A route announcement includes at least one network (not shown) associated with the AS 20, 22, 26, 28, or 32 currently of interest. The database is queried for information regarding a route announcement, via step 341. Via step 342, the record of interest is scanned for the route announcement currently of interest.

In one embodiment, steps 341 and 342 include searching the list of objects in the ARIN maintained database for each network in the route announcement. If a network is found, then the country code for each network that is found is associated with the AS number of the AS 20, 22, 26, 28, or 32 currently of interest, via step 344. Thus, in step 344, more than one country code can be associated with a particular AS number. In one embodiment, step 344 includes creating or adding to the database associating the AS number with the country code. Next, steps 341–344 are repeated for each route announcement. Then, steps 334 through 345 are then repeated for each remaining AS 20, 22, 26, 28, or 32, via step 346.

Figure 10C:
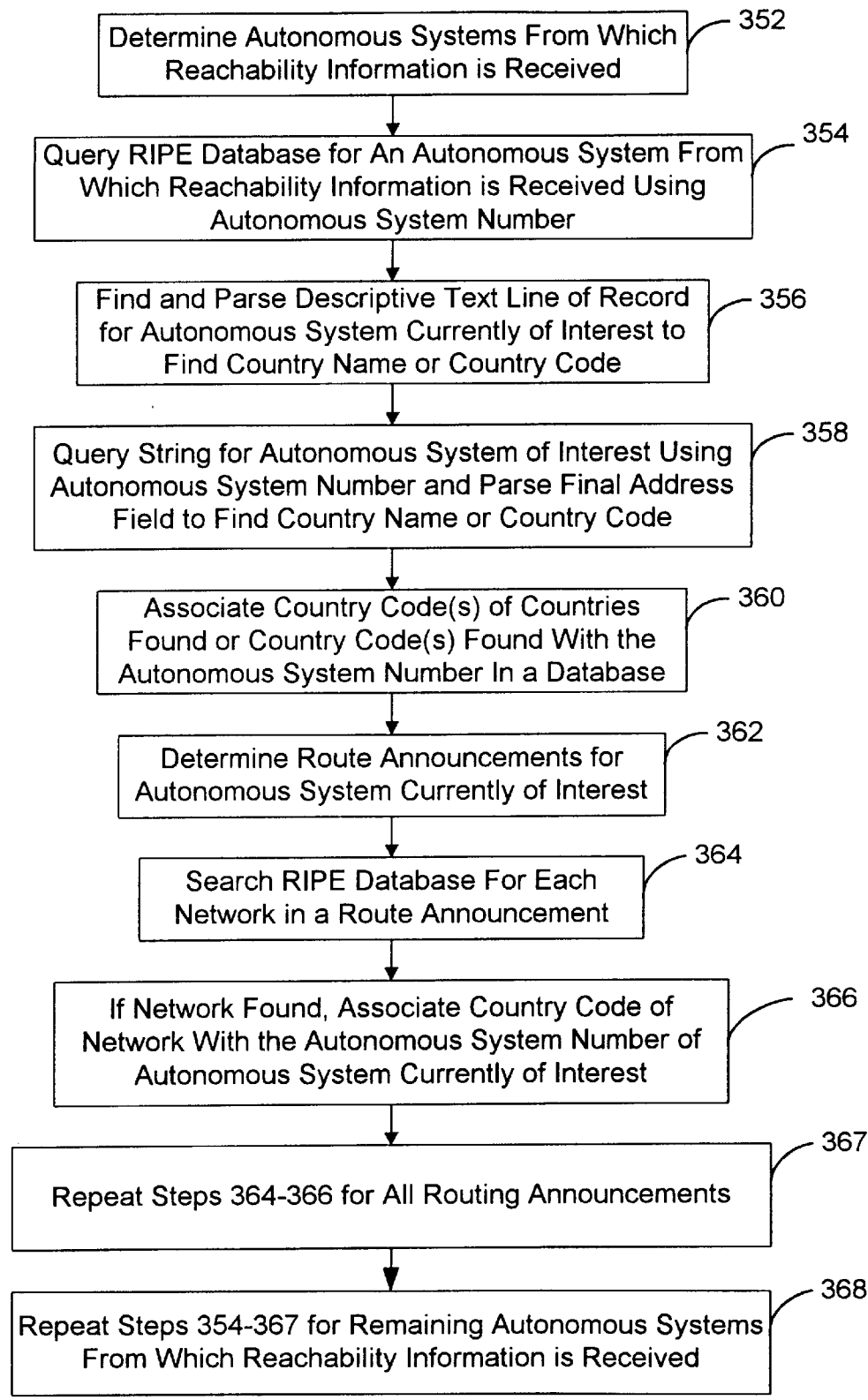
FIG. 10C is flow chart of a preferred embodiment of the method in accordance with the present invention for associating a geographic area with an address using a second external database.

FIG. 10C depicts a more detailed flow chart of a preferred embodiment of the method 350 used to associate an AS with a geographic area using a RIPE maintained database. The ASs 20, 22, 26, 28, and 32 for which the AS 12 receives reachability information are determined, via step 352. The database maintained by RIPE is then queried for information regarding one of the ASs 20, 22, 26, 28, and 32, via step 354. In one embodiment, step 354 includes looking up the RIPE aut-num object for the AS number of the AS 20, 22, 26, 28, or 32 that is of interest. Via step 356 the final descriptive text line of the record is found and parsed to find the country name or country code of the AS 20, 22, 26, 28, or 32 that is of interest. Via step 358, whois.ripe.net is queried for the string "ASxxxx" where xxxx is the AS number for the AS 20, 22, 26, 28, or 32 that is of interest. In this embodiment, step 358 also includes searching the returned text for certain records having one or more address fields. Step 358 also includes parsing the final address field to find a country name or country code. If the address contains a country name, that country's code is used to associate the AS number with the country code in step 360. If the address contains a country code, that country code is used to associate the AS number with the country code in step 360. In one embodiment, step 360 includes creating a database associating the AS number with the country code. The route announcements for the AS 20, 22, 26, 28, or 32 of interest are also determined, via step 362. The RIPE database is then searched for each network in a route announcement, via step 364. In one embodiment, step 364 includes searching the list of inetnum objects in the RIPE maintained database for each network in the route announcement. If the network is found, then the country code associated with that network is found and associated with the AS number of the AS 20, 22, 26, 28, or 32 currently of interest, via step 366. In one embodiment, step 366 includes creating or adding to the database associating the AS number with the country code. Thus, in step 366, more than one country code can be associated with a particular AS number. Next, steps 364–366 are repeated for each route announcement. Then, steps 354 through 367 are then repeated for each remaining AS 20, 22, 26, 28, or 32, via step 368.

Figure 10D:
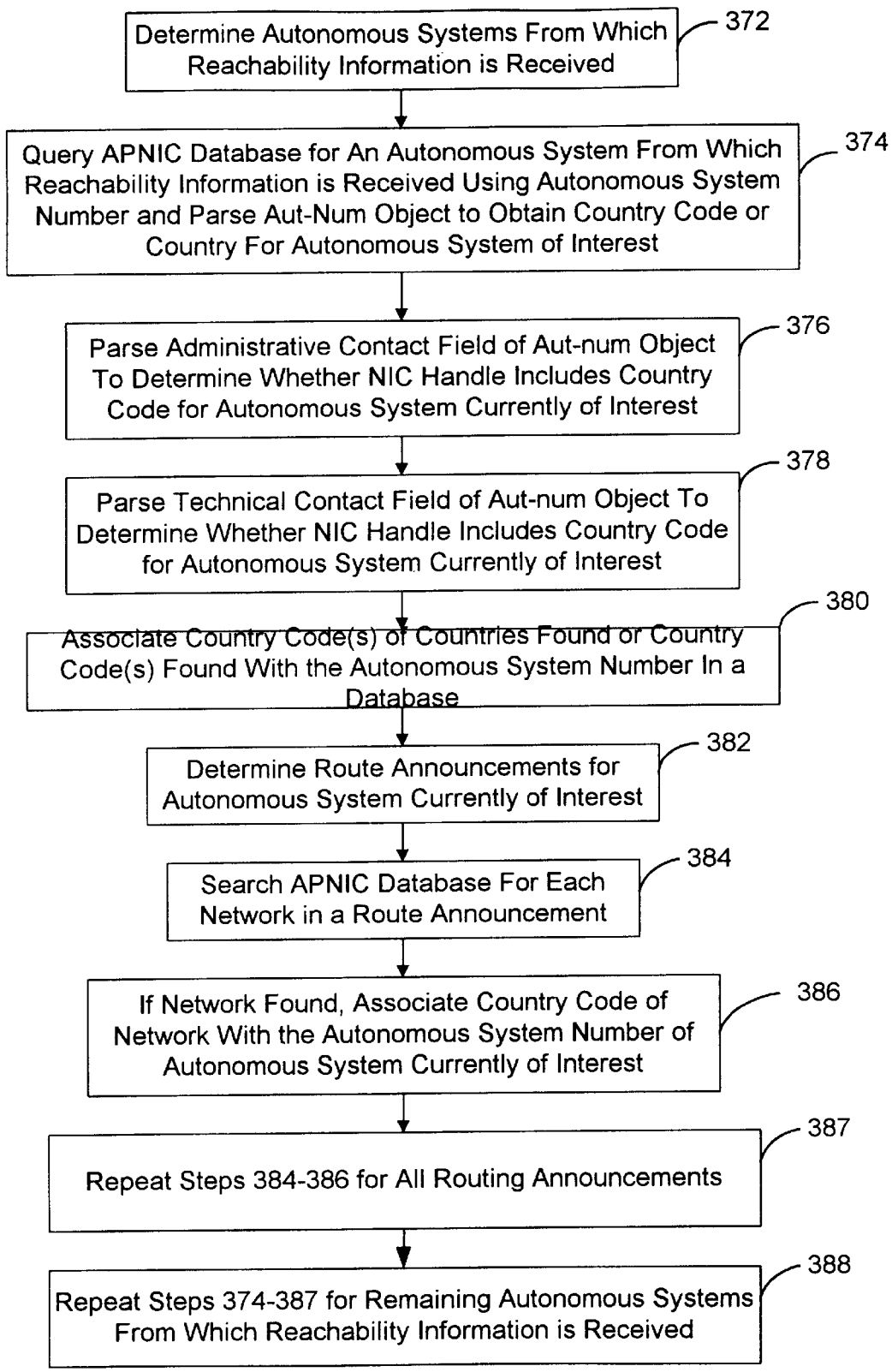
FIG. 10D is flow chart of a preferred embodiment of the method in accordance with the present invention for associating a geographic area with an address using a third external database.

FIG. 10D depicts a more detailed flow chart of a preferred embodiment of a method 370 used to associate an AS with a geographic area using an APNIC maintained database. The ASs 20, 22, 26, 28, and 32 for which the AS 12 receives reachability information are determined, via step 372. The database maintained by APNIC is then queried for information regarding one of the ASs 20, 22, 26, 28, and 32, via step 374. In one embodiment, step 374 includes looking up the APNIC aut-num object for the AS number of the AS 20, 22, 26, 28, or 32 that is of interest and parsing that object to find a country name or an country code. The administrative contact field of the aut-num object is then parsed to determine if the NIC handle is of the form XXX-YY, where YY is the country code, via step 376. The technical contact field of the aut-num object is then parsed to determine if the NIC handle is of the form XXX-YY, where YY is the country code, via step 378. The country code(s) found in steps 374, 376, or 378 and the code(s) for the country found in step 374 are then associated with the AS number of the AS 20, 22, 26, 28, or 32, via step 380. In one embodiment, step 380 includes creating a database associating the AS number with the country code. The route announcements for the AS 20, 22, 26, 28, or 32 of interest are also determined, via step 382. The RIPE database is then searched for each network in the route announcement, via step 384. If the network is found, then the country code associated with that network is found and associated with the AS number of the AS 20, 22, 26, 28, or 32 currently of interest, via step 386. In one embodiment, step 386 includes creating or adding to the database associating the AS number with the country code. Thus, in step 386, more than one country code can be associated with a particular AS number. Next, steps 384–386 are repeated for each route announcement. Then, steps 374 through 387 are then repeated for each remaining AS 20, 22, 26, 28, or 32, via step 388.

The methods 300, 310, 330, 350, and 370 associate the geographic area with the destination address such that the geographic area corresponding to the destination address can be used to select a route. Preferably, this association is provided via a database in which the geographic area for the AS assigned the IP address of the destination is mapped to the AS number of the AS and, therefore, to the IP address of the destination. Consequently, a more efficient route can be chosen, allowing transit time and probability that a packet will be dropped to be reduced.

Although discussed in the context of ASs 12, 20, 22, 26, 28, and 32, the present invention can be extended to the IP network (not shown) level. In such an extension, it is possible to map each known IP network to a country code or other indication of geographic area corresponding to a destination. Each route would then be weighted based on the geographic area of the route's corresponding network. This approach has the advantage of increasing granularity at the cost of increased complexity and a large increase in the number of router configuration lines.

A method and system has been disclosed for improving the routes for a packet selected by a router. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for selecting a route for a data packet from a source to a destination, a first geographic are corresponding to the source and a second geographic area corresponding to the destination, the destination having an address not indicating the second geographic area, the source being associated with a first autonomous system corresponding to the first geographic area, the destination being associated with a second autonomous system corresponding to the second geographic area, the first geographic area including a first country and the second geographic area including a second country, the method comprising the steps of:

(a) associating the address for the destination with the second geographic area to allow selection of the route for the data packet based on the second geographic area, the associated step (a) further including the steps of (a1) associating the second autonomous system with the second geographic area to allow selection of the route based on the second geographic area;

(a2) associating the second autonomous system with the second country to allow selection of the route based on the second country;

(a3) accessing an external database including a designation of the second autonomous system an indication of the second country; and (a4) using the designation of the second autonomous system and the indication of the second country to associate the second autonomous system with the second country to allow selection of the route for the data packet to be transmitted to the autonomous system based on the second country; and (b) selecting the route based on a second geographic area.

2. The method of claim 1 wherein the selecting step (b) further includes the steps of:

(b1) setting a preference to select the route to include a first link directly from the first autonomous system to a third autonomous system in the second country if the first link is available or setting the preference to select the route to include a second link directly from the first autonomous system to a fourth autonomous system in a third country if the first link is not available; and (b2) selecting th route based on the preference.

3. The method of claim 2 wherein the second autonomous system is the same as the third autonomous system.

4. The method of claim 3 wherein the first country is different from the second country.

5. A method for facilitating selection of a route for a data packet, the method comprising the steps of:

(a) obtaining information relating to an autonomous system, the autonomous system having a geographic area, the information including the geographic area, wherein obtaining step (a) further includes the steps of (a1) accessing an external database including information relating to the autonomous system, the information including a designation of the autonomous system and an indication of the geographic area, the designation of the autonomous system and the indication of the geographic area being in a form which is not usable for selecting a route for a data packet to be transmitted to the autonomous system;

(a2) scanning the information to find the designation of the autonomous system and the indication of the geographic area; and (b) associating the autonomous system with the geographic area to allow selection of the route based on the geographic area, wherein associating step (b) further includes the step of (b1) using the designation of the autonomous system and the indication of the geographic area to associate the autonomous system with the geographic area to allow selection of the route for the data packet to be transmitted to the autonomous system using the geographic area.

6. The method of claim 5 wherein the designation of the autonomous system further includes an autonomous system number and the indication of the geographic area further includes a country code.

7. A computer-readable medium containing a program for selecting a route for a data packet from a source to a destination, the wherein a first geographic area corresponds to the source and a second geographic area corresponds to the destination, the destination having an address not indicating the second geographic area corresponding to the destination, the source being associated with a first autonomous system corresponding to the first geographic area, the destination being associated with a second autonomous system corresponding to the second geographic area, the first geographic area including a first country and the second geographic area including a second country, the program including instructions for:

(a) associating the address for the destination with the second geographic area to allow selection of the route for the data packet based on the second geographic area, the associated step (a) further including the steps of (a1) associating the second autonomous system with the second geographic area to allow selection of the route based on the second geographic area;

(a2) associating the second autonomous system with the second country to allow selection of the route based on the second country;

(a3) accessing an external database including a designation of the second autonomous system an indication of the second country; and (a4) using the designation of the second autonomous system and the indication of the second country to associate the second autonomous system with the second country to allow selection of the route for the data packet to be transmitted to the autonomous system based on the second country; and (b) selecting the route based on a second geographic area.

8. A computer-readable medium containing a program for facilitating selection of a route for a data packet, the program including instructions for:

(a) obtaining information relating to an autonomous system, the autonomous system having a geographic area, the information including the geographic area, wherein obtaining step (a) further includes the steps of (a1) accessing an external database including information relating to the autonomous system, the information including a designation of the autonomous system and an indication of the geographic area, the designation of the autonomous system and the indication of the geographic area being in a form which is not usable for selecting a route for a data packet to be transmitted to the autonomous system;

(a2) scanning the information to find the designation of the autonomous system and the indication of the geographic area; and (b) associating the autonomous system with the geographic area to allow selection of the route based on the geographic area, wherein associating step (b) further includes the step of (b1) using the designation of the autonomous system and the indication of the geographic area to associate the autonomous system with the geographic area to allow selection of the route for the data packet to be transmitted to the autonomous system using the geographic area.

9. A system for facilitating selection of a route for a data packet, the system comprising:

means for obtaining information relating to an autonomous system, the autonomous system having a geographic area, the information including the geographic area, wherein the obtaining means further include means for accessing an external database including information relating to the autonomous system, the information including a designation of the autonomous system and an indication of the geographic area, the designation of the autonomous system and the indication of the geographic area being in a form which is not usable for selecting a route for a data packet to be transmitted to the autonomous system;

means for scanning the information to find the designation of the autonomous system and the indication of the geographic area; and means for associating the autonomous system with the geographic area to allow selection of the route based on the geographic area, wherein the associating means further includes means for using the designation of the autonomous system and the indication of the geographic area to associate the autonomous system with the geographic area to allow selection of the route for the data packet to be transmitted to the autonomous system using the geographic area.

10. The system of claim 9 wherein the obtaining means further includes:

means for accessing an external database including information relating to the autonomous system, the information including a designation of the autonomous system and an indication of the geographic area, the designation of the autonomous system and the indication of the geographic area being in a form which is not usable for selecting a route for a data packet to be transmitted to the autonomous system;

means for scanning the information to find the designation of the autonomous system and the indication of the geographic area; and wherein the associating means further includes means for using the designation of the autonomous system and the indication of the geographic area to associate the autonomous system with the geographic area to allow selection of the route for the data packet to be transmitted to the autonomous system using the geographic area.

11. The system of claim 9 wherein the designation of the autonomous system further includes an autonomous system number and the indication of the geographic area.

* * * * *